INVENTOR
OSCAR E. ROSAEN

BY
ATTORNEYS

Aug. 1, 1967  O. E. ROSAEN  3,333,696
SELF-CLEANING MOBILE FILTER
Filed Feb. 1, 1965  2 Sheets-Sheet 2

INVENTOR
OSCAR E. ROSAEN

BY *Hauke & Hauke*

ATTORNEYS

United States Patent Office 3,333,696
Patented Aug. 1, 1967

3,333,696
SELF-CLEANING MOBILE FILTER
Oscar E. Rosaen, Grosse Pointe, Mich., assignor to The Rosaen Filter Company, Hazel Park, Mich., a corporation of Michigan
Filed Feb. 1, 1965, Ser. No. 429,552
8 Claims. (Cl. 210—90)

The present invention relates to fluid systems, particularly to such systems utilizing a mobile or bayonet filter device, and more particularly to a device including means for cleaning the filter elements of such devices in place.

Certain copending applications Ser. Nos. 340,365 and 341,488 filed Jan. 27, 1964, now abandoned in favor of continuation-in-part application Ser. No. 562,417, filed June 8, 1966 and now Patent No. 3,313,417, disclose and claim certain new mobile or bayonet filter devices. These devices are characterized by a construction which permits them to be supported by the fluid reservoir with an inlet end extending into the reservoir and an outlet end disposed exteriorly of the reservoir. This permits the devices to be constructed of less material and in a more economical manner than heretofore known devices. Further, the particular manner of construction permits ready access to the filter element for cleaning or replacement.

The present invention provides a filter device constructed in accordance with the disclosure of the aforementioned copending applications but in which means have been added for cleaning the filter element. Unlike heretofore known filter devices, however, the means employed for cleaning the filter element of the present invention does not utilize the working fluid for this purpose so that there is no loss of either system fluid or system pressure during the cleaning cycle. Further, valve means are provided for closing off the filter chamber from the reservoir and for directing the cleaning fluid through the filter element in a direction reverse to normal fluid flow therethrough to a collection chamber separated from the filter chamber. This permits air to be used as the cleaning fluid and insures that the foreign particles dislodged from the filter element will not again contaminate the system fluid.

It is an object then of the present invention to improve mobile or bayonet filter devices of the type disclosed in the aforementioned copending applications by providing means for cleaning the filter element of such filter devices in place.

It is another object of the present invention to permit air to be used as a cleaning fluid for cleaning filter elements in place by providing valve means closing communication between the filter chamber and the fluid reservoir during the cleaning cycle and means directing the cleaning fluid to a collection chamber separated from the filter chamber.

Figure 1:
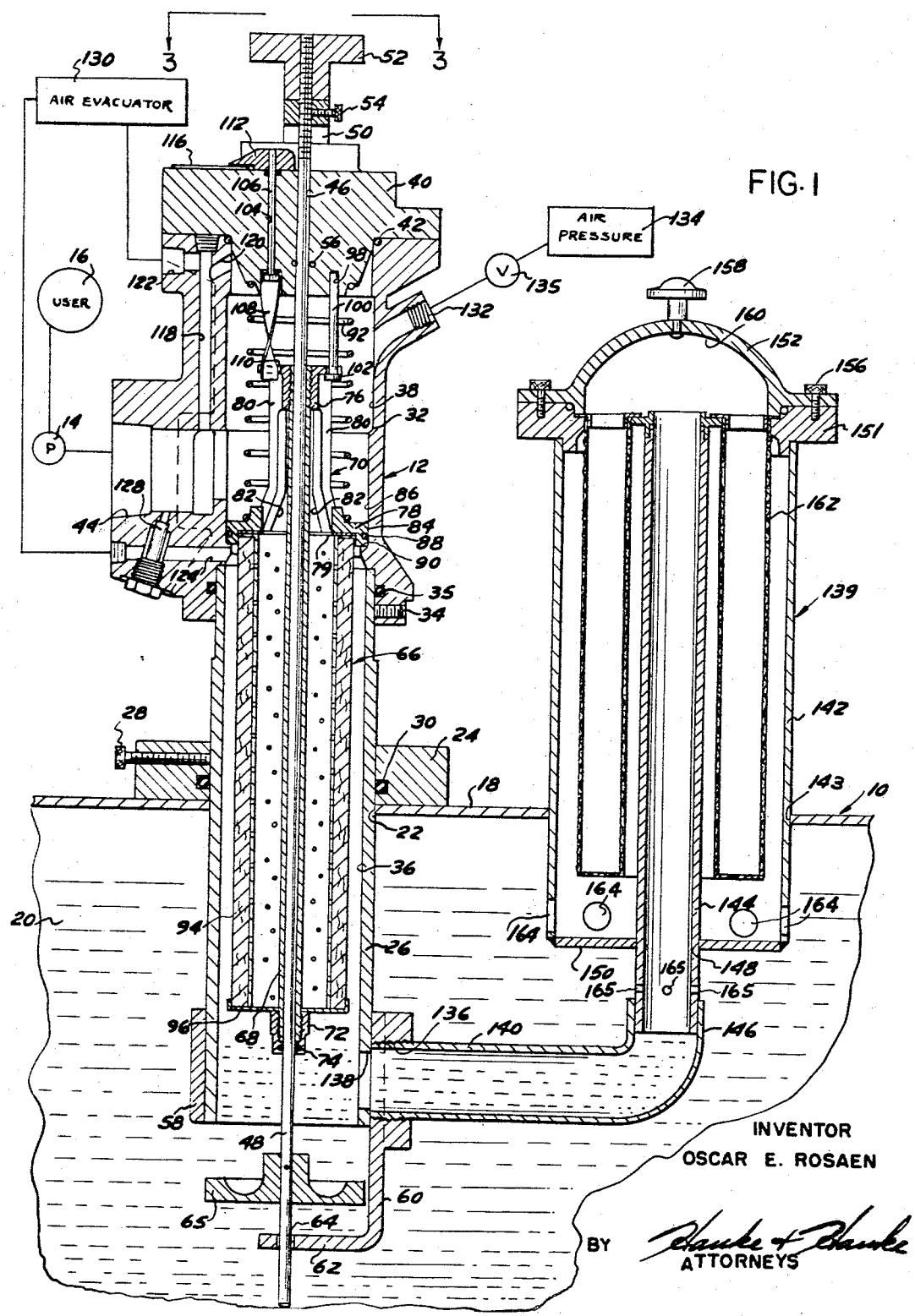

Still further objects of the present invention will readily occur to one skilled in the art to which the invention pertains upon reference to the following drawings in which like reference characters refer to like parts throughout the several views and in which FIG. 1 is a longitudinal cross-sectional view of a preferred filter device of the present invention in which other preferred components of a fluid system are shown fragmentarily or diagrammatically and in which the filter device is illustrated in an operating position.

Figures 2, 3:
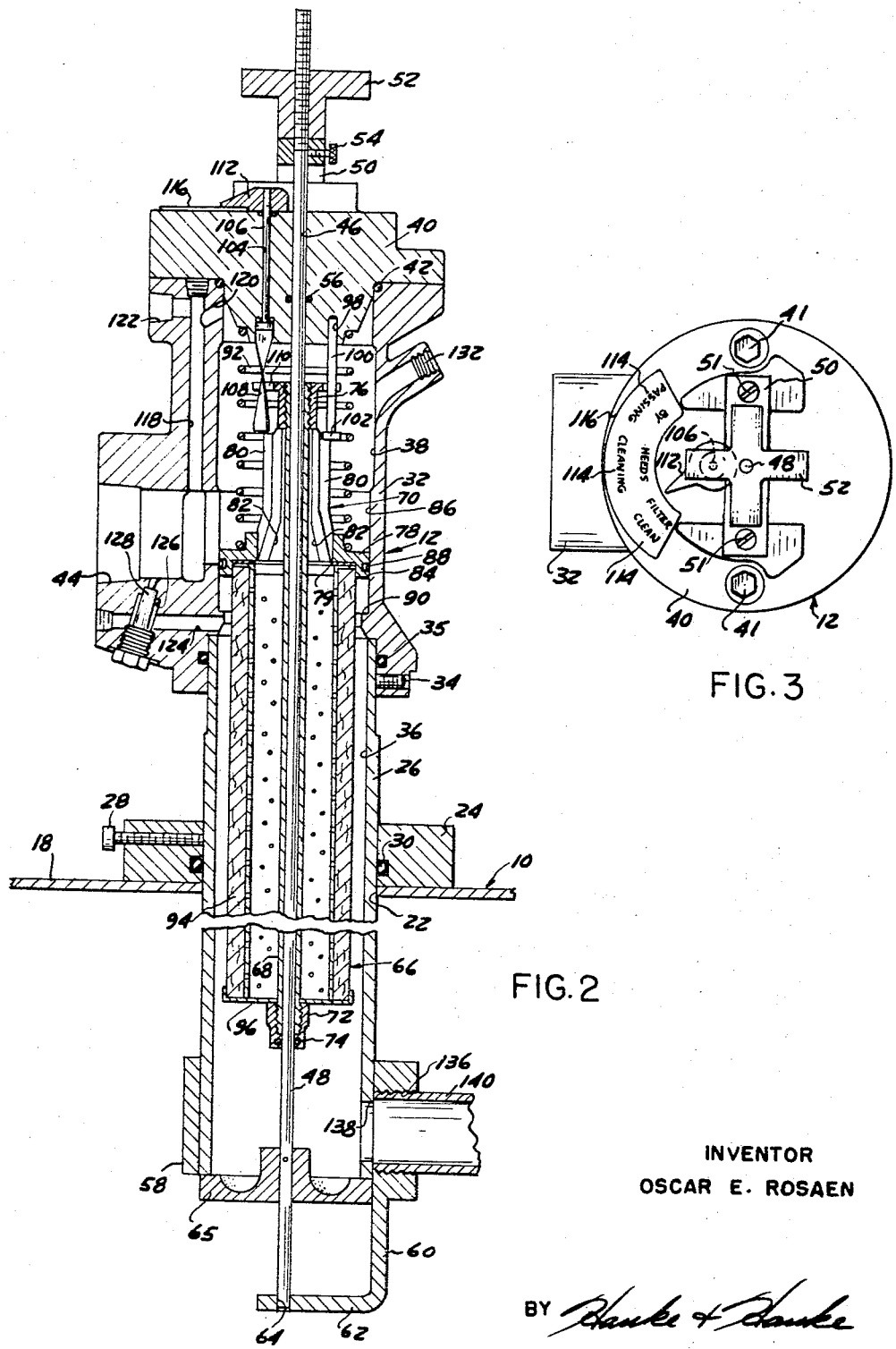

FIG. 2 is a view similar to FIG. 1 with some parts of the system not shown and with the filter device illustrated in the cleaning position, and FIG. 3 is a top elevational view as seen substantially from line 3—3 of FIG. 1.

Now referring to the drawings for a more detailed description of the present invention, a preferred fluid system is illustrated as comprising a fluid reservoir 10, a mobile or bayonet type filter device 12, a fluid pump 14 and a fluid user 16.

The reservoir 10 is preferably provided with a top plate 18 and is at least partially filled with a suitable system fluid 20. The top plate 18 is provided with an opening 22 and an annular mounting member 24 is secured to the exterior surface of the top plate 18 in any suitable manner and outlines the opening 22.

The filter device 12 preferably comprises a tubular housing member 26 adjustably mounted to extend through the opening 22 by screws or bolts 28 carried by the mounting member 24. The tubular housing member is provided with an inlet end disposed within the fluid reservoir 10 below the minimum level of fluid therein and an opposite end disposed exteriorly of the reservoir 10. A fluid seal 30 carried by the mounting member 24 prevents fluid leakage along the exterior surface of the tubular member 26.

The filter device 12 further preferably comprises a substantially cylindrical housing member 32 mounted over the exterior end of the tubular member 26 and secured thereto by a plurality of annularly spaced screws 34. An O-ring seal 35 prevents fluid leakage between the tubular member 26 and the housing member 32. The interior of the tubular member 26 defines a filter chamber 36 and the housing member 32 is hollow to define an outlet chamber 38 in alignment with the filter chamber 36. The upper end of the outlet chamber 38 is closed by a cap member 40 secured to the housing member 32 by bolts or screws 41 as can best be seen in FIG. 3. An O-ring seal 42 is carried by the housing member 32 to prevent fluid leakage past the cap member 40. The housing member 32 is provided with an outlet 44 connecting the outlet chamber 38 to the pump 14.

The cap member 40 is provided with an axial through bore 46 which provides the means by which an elongated rod 48 extends through the outlet chamber 38, the filter chamber 36 and into the fluid reservoir 10 past the inlet end of the tubular member 26. The exterior end of the rod 48 is threaded and as can best be seen in FIG. 3, extends through a bracket 50 and is received by a nut member 52. The bracket 50 is supported by the cap member 40 and is secured thereto by screws 51 as can be seen in FIG. 3. A radially disposed thumb screw 54 is carried by the bracket 50 and when tightened engages the rod 48. An O-ring seal 56 carried by the cap member 40 prevents fluid leakage past the rod 48.

A sleeve 58 is secured to the interior end of the tubular member 26 and is provided with an axially extending portion 60 which supports a transverse portion 62 in a position axially spaced from and extending across the inlet end of the tubular member 26. The transverse portion 62 is provided with a central opening 64 which receives the free end of the rod 48. A valve disc 65 is secured to the rod 48 in a position spaced intermediate the inlet end of the tubular member 26 and the transverse portion 62 and is operable upon the rod 48 being moved upwardly to close the inlet end of the tubular member 26 as illustrated in FIG. 2 and to thereby close communication between the reservoir 10 and the filter chamber 36. It is apparent then that by pulling the nut member 52 upwardly to move the rod 48 axially upwardly, the valve disc 64 will be moved to a closed position. By tightening the nut member 52 against the bracket 50, the valve disc 64 will be locked in the closed position.

A filter assembly generally indicated at 66 is axially slidably mounted within the housing member 32 and the tubular member 26. The filter assembly 66 comprises an elongated sleeve 68 axially slidably received by the rod 48. One end of the sleeve 68 is externally threaded to be secured to an internally threaded portion of a porting member 70 and the opposite end carries a nut member 72 through which the rod 48 extends. A seal 74 carried by the nut member 72 prevents fluid leakage between the sleeve 68 and the rod 48.

The porting member 70 is mounted within the outlet chamber 38 and comprises an upper annular portion 76 secured to the sleeve 68 and a lower annular portion 78 connected to the upper annular portion 76 by a plurality of substantially axially extending legs 80. The legs 80 define a plurality of annularly spaced ports 82. The lower annular portion 78 is provided with an outer annular surface 84 which axially slidably engages a guide surface 86 formed in the housing member 32. A piston ring 88 is carried by the lower annular portion 78 and engages the guide surface 86 to prevent fluid leakage along the surfaces 84 and 86. The lower annular portion 78 is provided with a central opening 79. The housing member 32 is provided with an internal shoulder 90 which limits downward axial movement of the porting member 70 and a spring member 92 biased between the cap member 40 and the lower annular portion 78 urges the porting member 70 toward the shoulder 90.

The filter assembly 66 preferably further comprises a substantially cylindrical filter element 94 encompassing the sleeve 68 and sandwiched between the lower annular portion 78 and a flanged closure plate 96 by means of the nut member 72. The filter element 94 is carried in the filter chamber 36 and is axially movable with the sleeve 68 and the porting member 70 along the rod 48.

The cap member 40 is provided with a bore 98 in which is fixed a guide pin 100. The guide pin 100 extends into the outlet chamber 38 and passes through a slot provided in the upper annular portion 76 to guide axial movement of the porting member 70. A screw 102 is carried in the free end of the guide pin 100 and is provided with an enlarged head so that upon removal of the cap member 40 the filter assembly 66 will be removed from the filter device 12.

The cap member 40 is also provided with a through bore 104 which rotatably carries a shaft 106. The interior end of the shaft 106 is fixed to an actuator element 108 which is in turn received in a rectangular slot 110 provided in the upper annular portion 76 of the porting member 70. The actuator element 108 is formed by twisting a flat strip of material uniformly about its longitudinal axis from end to end so that as the porting member 70 moves axially, the actuator element 108 engaging in the slot 110 is caused to rotate. The rotation of the actuator element 108 and the shaft 106 then directly corresponds to the axial movement of the filter assembly 66. A pointer element 112 is fixed to the exterior end of the shaft 106 and as can best be seen in FIG. 3, cooperates with suitable indicia 114 provided on an indicating plate 116 to indicate the rotated position of the shaft 106 and thus the axial position of the filter assembly 66.

The housing member 32 is provided with an axially extending passage 118 which registers at one end with a radially extending passage 120 and a port 122. The passage 120 registers with the upper portion of the outlet chamber 38. The opposite end of the passage 120 registers with the outlet 44. The housing member 32 is also provided with a radially extending passage 124 registering at one end with the upper portion of the filter chamber 36. A passage 126 intersects the passage 124 and registers with the outlet 44. A filter member 128 is carried in the passage 126. The port 122 and the passage 124 are connected to a conventional air evacuation means 130.

The housing member 32 is also provided with a port 132 registering with the outlet chamber 38 and preferably disposed with its axis inclined somewhat to direct fluid substantially axially into the outlet chamber 38. The port 132 is connected to a source of air pressure 134 through a normally closed valve 135.

The sleeve 58 is provided with a radially disposed port 136 which registers with an opening 138 provided in the side of the tubular member 24. A tubular conduit 140 disposed within the reservoir 10 connects the port 136 with a collector assembly 139.

The collector assembly 139 as can be seen in FIG. 1 preferably comprises a tubular member 142 extending vertically through an opening 143 provided in the top plate 18 of the reservoir 10. The tubular member 142 is preferably fixed in position with a lower end disposed within the reservoir 10 and an upper end disposed above the top plate 18. A stand pipe 144 has its lower end fixed in fluid tight fashion to an upstanding portion 146 of the tubular conduit 140 and extends axially upwardly into the tubular member 142 through on opening 148 provided in a bottom wall 150 closing the lower end of the tubular member 142.

An annular flanged member 151 is secured to the upper edge of the tubular member 142 and provides the means for carrying a cap member 152. The cap member 152 is secured to the flanged member 151 by bolts 156 and is provided with an upstanding handle portion 158. The cap member forms a chamber 160 disposed above and in communication with the interiors of the stand pipe 144 and the tubular member 142.

An annular wire basket 162 is carried in a position intermediate the stand pipe 144 and the tubular member 142. A plurality of annularly spaced openings 164 provided in the tubular member 142 below the wire basket 162 to provide communication between the space between the stand pipe 144 and the tubular member 142 and the reservoir 10. A plurality of annularly spaced small openings 165 are provided in the stand pipe 144 intermediate the bottom wall 150 and the upstanding portion 146 to insure that the tubular conduit 140 will be filled with fluid.

In operation the filter device 12 is normally in the position illustrated in FIG. 1 with the valve disc 64 spaced from the end of the tubular member 26 and the filter assembly 66 in the position in which the lower annular portion 76 of the porting member 70 engages the shoulder 90.

In the operating position, fluid is drawn by the pump 14 through the inlet end of the tubular member 26, radially inwardly through the filter element 94 and through the porting member 70 to the outlet 44.

As the filter element 94 becomes clogged an increase in the pressure differential is produced across the lower annular flange portion 78 of the porting member 70 which causes the filter assembly 66 to be moved axially against the force of the spring member 92. As heretofore pointed out, the pointer element 112 will rotate to indicate the axial position of the filter assembly 66 and since the axial position of the filter assembly 66 is essentially a linear function of the degree of clogging of the filter element 94 by providing suitable indicia 114, the condition of the filter element 94 will be visibly indicated exteriorly of the device 12. The thumb screw 54 prevents the rod 48 and the valve disc 64 from moving with the filter assembly 66.

As the filter device 12 is operating, air which tends to become entrapped in the upper portions of the outlet chamber 38 and the filter chamber 36 will be drawn by the pump 14 out the outlet 44 through the passages 118 and 120 and the passages 124 and 126 respectively. The filter member 128 insures that any fluid escaping with air through the passages 124 and 126 will be filtered before reaching the fluid user 16.

When the filter element 94 reaches a predetermined clogged condition the filter assembly 66 will have moved axially to a position in which a bypass path is opened directly from the filter chamber 36 to the outlet 44 past the surface 84 of the porting member 70. The filter element 94 now requires cleaning.

To clean the filter element 94 the thumb screw 54 is loosened and the nut member 52 is tightened against the bracket 50 to move the valve disc 64 upwardly against the inlet end of the tubular member 24 to the position illustrated in FIG. 2. This closes communication between the filter chamber 36 and the reservoir 10.

The valve 135 is then opened to direct air under pressure through the port 132 and into the outlet chamber 138 and through the filter element 94 in a direction reverse to normal fluid flow therethrough. The air under pressure dislodges the foreign particles accumulated on the inlet side of the filter element 94 and carries these particles through the tubular member 26, through the opening 138 and port 136 through the conduit 140 and to the collector assembly 139. The basket 162 collects the foreign particles and any fluid which may have been carried to the collector assembly 139 is returned in a clean condition to the reservoir 10 through the opening 164. The cap member 152 permits the collected foreign particles to be periodically removed from the system.

Before the fluid system is returned to normal operation, the air evacuation means 130 is actuated to purge any air which may have accumulated within the filter device 12 from the system.

It is apparent that a fluid system has been described in which means are provided for cleaning the filter element of a mobile or bayonet filter device in place. The particular means has the advantage that air can be used to perform the cleaning function and the foreign particles dislodged from the element are carried to a collection chamber rather than being returned to the system fluid.

It is also apparent that although I have described but one embodiment of my invention, many changes and modifications can be made therein without departing from the spirit of the invention as expressed by the scope of the appended claims.

I claim:
1. In a filtering system, a fluid reservoir and a self cleaning filtering assembly comprising,
 (a) a housing including a tubular housing member defining a filter chamber, said tubular member having an inlet end positioned within said reservoir,
 (b) means defining a collection chamber separated from said filter chamber and means connecting said filter chamber and said collection chamber,
 (c) a filter element carried in said filter chamber,
 (d) valve means operable upon being actuated to close said inlet end of said tubular member, and
 (e) means operable upon being actuated to direct a cleaning fluid under pressure through said filter element and into said collection chamber in a direction opposite to normal fluid flow through said element.

2. The system as defined in claim 1 and including a filter element carried in said collection chamber and means connecting said collection chamber to said reservoir.

3. The system as defined in claim 1 and including means sensing the clogged condition of said filter element and means disposed exteriorly of said housing and connected with said sensing means to indicate the clogged condition of said filter element.

4. The system as defined in claim 1 and including means for actuating said valve means comprising a rod member connected with said valve means and extending axially through said tubular member, said rod being provided with an end disposed exteriorly of said housing and means carried at said end for moving said rod axially.

5. In a filtering system, a fluid reservoir and a self cleaning filtering device comprising
 (a) a tubular housing member carried by said reservoir and having one end disposed within said reservoir and the opposite end disposed exteriorly thereof,
 (b) said tubular housing member defining a filter chamber normally open to said reservoir through said first mentioned end of said tubular housing member,
 (c) a housing member closing the exterior end of said tubular housing member and having an outlet communicating with said filter chamber,
 (d) a filter element carried in said filter chamber,
 (e) valve means operable upon being actuated to close said first mentioned end of said tubular member and thereby close communication between said reservoir and said filter chamber,
 (f) a collection chamber and means connecting said filter chamber and said collection chamber,
 (g) means extending exteriorly of said housing member for actuating said valve means, and
 (h) means operable upon being actuated to direct a cleaning fluid through said filter element in a direction reverse to normal fluid flow therethrough and to direct foreign particles dislodged from said filter element into said collection chamber.

6. The system as defined in claim 5 and in which said valve actuating means comprises an elongated rod member carried axially within said tubular housing member and having one end connected to said valve means and the opposite end extending exteriorly of said housing member.

7. The system as defined in claim 6 and in which said filter element is axially slidably carried by said rod member.

8. The system as defined in claim 6 and in which said valve means comprises a disc operable upon being moved axially to seat against the first mentioned end of said tubular housing member.

References Cited
UNITED STATES PATENTS

| | | |
|---|---|---|
| 3,053,389 | 9/1962 | Rosaen et al. |
| 3,076,336 | 2/1963 | Rosaen et al. |
| 3,080,058 | 3/1963 | Rosaen. |
| 3,117,525 | 1/1964 | Rosaen. |
| 3,283,903 | 11/1966 | Muller _____ 210—108 |
| 3,288,289 | 11/1966 | Rosaen _____ 210—131 X |
| 3,151,065 | 9/1964 | Smith et al. _____ 210—108 |
| 3,289,839 | 11/1966 | Muller _____ 210—108 X |

REUBEN FRIEDMAN, *Primary Examiner.*

D. M. RIESS, *Assistant Examiner.*